United States Patent [19]
Ito et al.

[11] Patent Number: 6,094,522
[45] Date of Patent: *Jul. 25, 2000

[54] VIDEO DATA RECORDING AND REPRODUCTION APPARATUS HAVING A PLURALITY OF INPUT/OUTPUT CONTROL DEVICES

[75] Inventors: Norikazu Ito; Hiroyuki Fujita; Yuichi Kojima, all of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/768,931

[22] Filed: Dec. 18, 1996

[30] Foreign Application Priority Data

Dec. 21, 1995 [JP] Japan ................................. 7-333703

[51] Int. Cl.[7] .............................. H04N 5/76; H04N 5/92
[52] U.S. Cl. ................................ 386/52; 386/64; 360/13; 369/83
[58] Field of Search ............................ 386/4, 52, 53–64; 360/13; 369/83; 345/328; 348/7–8, 10, 13; H04N 5/76, 9/79, 5/92

[56] References Cited

U.S. PATENT DOCUMENTS

| | | | |
|---|---|---|---|
| Re. 35,651 | 11/1997 | Bradley et al. ............................ | 348/7 |
| 4,746,994 | 5/1988 | Ettlinger . | |
| 4,920,432 | 4/1990 | Eggers et al. ............................ | 360/71 |
| 4,979,050 | 12/1990 | Westland et al. ........................ | 386/52 |
| 5,051,845 | 9/1991 | Gardner et al. ......................... | 386/52 |
| 5,103,348 | 4/1992 | Sasho et al. ............................. | 386/68 |
| 5,307,456 | 4/1994 | MacKay . | |
| 5,339,393 | 8/1994 | Duffy et al. ............................. | 386/52 |
| 5,517,652 | 5/1996 | Miyamoto et al. ................ | 364/940.92 |
| 5,539,527 | 7/1996 | Kajimoto et al. ....................... | 386/52 |
| 5,574,505 | 11/1996 | Lyons et al. ............................ | 348/426 |
| 5,647,047 | 7/1997 | Nagasawa ............................... | 386/52 |
| 5,659,760 | 8/1997 | Enami ..................................... | 395/742 |
| 5,671,377 | 9/1997 | Bleidt et al. ............................ | 395/328 |
| 5,706,386 | 1/1998 | Miyazawa ............................... | 386/52 |
| 5,736,981 | 4/1998 | Nobutani et al. ....................... | 345/185 |
| 5,740,388 | 4/1998 | Hunt ........................................ | 395/328 |
| 5,787,224 | 7/1998 | Itoh et al. ................................ | 386/52 |
| 5,809,246 | 9/1998 | Goldman ............................. | 364/922.7 |

FOREIGN PATENT DOCUMENTS

| | | |
|---|---|---|
| 0 615 244 | 9/1994 | European Pat. Off. . |
| 0 667 710 | 8/1995 | European Pat. Off. . |
| 0 715 460 | 6/1996 | European Pat. Off. . |
| 5-165932 | 7/1993 | Japan .......................... G06F 15/62 |
| 5-292146 | 11/1993 | Japan .......................... H04L 29/06 |
| WO 95 25400 | 9/1995 | WIPO . |

*Primary Examiner*—Thai Tran
*Attorney, Agent, or Firm*—Frommer, Lawrence & Haug, LLP; William S. Frommer; Dennis M. Smid

[57] ABSTRACT

A video data recording and reproduction apparatus in which a plurality of input/output control circuits input and output video data between the recording and reproducing apparatus and external apparatus based on a control signal received from an external apparatus, predetermined special effect processing is performed on the video data reproduced from the storage medium by the recording and reproduction apparatus, and the recording and reproduction apparatus store this processed video data on the storage medium.

7 Claims, 13 Drawing Sheets

VIDEO DATA RECORDING AND REPRODUCTION APPARATUS HAVING A PLURALITY OF INPUT/OUTPUT CONTROL DEVICES

BACKGROUND OF THE INVENTIONS

1. Field of the Invention

The present invention relates to an audio and/or video data recording and reproduction apparatus for recording video data of the digital format and reproducing the recorded audio and/or video data.

2. Description of the Related Art

For example, in a television broadcasting station, a video to be telecast in a news program etc. is usually produced by recording and individually managing the video (stock video) and audio serving as the basis of the video to be telecast by a TV camera etc. including a video tape recorder (VTR) on video tapes and having an editor use a VTR in the editing room according to need to reproduce one or more of the audio and/or video data (AV data) recorded on the video tapes and combining the reproduced stock videos to record the video to be actually broadcast on another tape.

However, when the stock videos are managed in the state recorded on video tapes, the work efficiency in selecting the necessary videos from among the large number of stock videos becomes poor. Further, there also exists a need to convey the tapes on which the stock videos are recorded from the storage place to the editing room. Further, it is difficult for a number of editors to use the same stock videos. Such a problem is particularly notable when a large number of stock videos are used for the production of one news video.

Further, the news video produced on the tape is generally carried to and load by hand into a VTR for transmitting the program or a cart machine containing the VTR for transmitting the program. However, since it is necessary to perform the operations such as management of the news videos or changing the order of transmission at the stage of transmitting the program by hand, the efficiency is poor and mistakes can occur due to human error, so the system lacks reliability.

In order to solve such a problem, use is made of a so-called server system as used in a computing system for enabling centralized management and use of the stock videos or the videos for broadcast and therefore shared use of stock videos.

FIG. 1 is a view of an example of the configuration of a example of a server system 8 for audio and/or video data.

As shown in FIG. 1, the server system 8 is basically configured by the basic component elements of the computer, that is, a CPU 401, ROM 402, RAM 403, high speed bus 404, device interfaces $405_m$, data recording and reproduction apparatus $406_m$ connected via the same, input/output interfaces $407_n$, audio and/or video data compressing means $408_n$ connected via the same, and audio and/or video data expanding means $409_n$ corresponding to the audio and/or video data compressing means $408_n$.

Further, where the server system 8 is realized on a computer different from the host application system, a LAN use interface 411 connecting a LAN 410 and the server system 8 is provided.

When the server system 8 records the audio and/or video data, the audio and/or video data compressing means $408_n$ compress the input audio and/or video data $S40_n$ to generate the compressed audio and/or video data $S41_n$ and transfer the same via the input/output interfaces $407_n$ to the high speed bus 404.

The compressed audio and/or video data transferred to the high speed bus 404 are usually temporarily stored (buffered) in the RAM 403 for the data flow rate control etc. and then transferred to the bus 404 again and appropriately recorded in the data recording and reproduction apparatuses $406_m$ via the device interfaces $405_m$.

Further, when the server system 8 reproduces the audio and/or video data, the compressed audio and/or video data recorded in the data recording and reproduction apparatuses $406_n$ are reproduced and then transferred via the device interfaces $405_m$ to the high speed bus 404.

The compressed audio and/or video data transferred to the high speed bus 404 are buffered in the RAM 403 for the data flow rate control etc. in the same way as that at the recording, transferred again to the high speed bus 404, pass through the input/output interfaces $407_n$, and become the input data $S42_n$ to the audio and/or video data expanding means $409_n$.

The audio and/or video data expanding means $409_n$ decode the video signals $S43_n$ from the input data $S42_n$ and output the same from the system.

When the server system 8 records and reproduces the audio and/or video data, the operations of all of the input/output interfaces $407_n$, the high speed bus 404, and the device interfaces $405_m$ are controlled by the CPU 401 based on the commands transferred from the application system via the LAN 410, LAN use interface 411, high speed bus 404, and RAM 403.

Note that, where the operation commands are supplied from not the application system, but from the input/output side of the video signal, control lines $S44_n$ connected to the input/output interfaces $407_n$ as indicated by the broken lines in FIG. 1 become necessary. In this case, the commands supplied from the control lines $S44_n$ are communicated to the CPU 401 via the input/output interfaces $407_n$, the high speed bus 404, and the RAM 403, and the CPU 401 controls the operation of the input/output interfaces $407_n$, high speed bus 404, and the device interfaces $405_m$ based on the commands supplied from the control lines $S44_n$.

FIG. 2 is a view of the configuration of an editing system 9 using the server system 8 shown in FIG. 1.

When audio and/or video data are edited by using the server system 8, as shown in for example FIG. 2, use is made of an editing system 9 comprised of editing apparatuses $90_1$ and $90_2$, connected to a server system 8, each of which having two audio and/or video data input terminals and one audio and/or video output terminal (AV) and a control signal terminal (C) corresponding to each of these audio and/or video signal input/output terminals and performing cutting to connect a plurality of audio and/or video data or addition of special effects to the audio and/or video data. The editor edits the audio and/or video data supplied from the server system 8 by using the editing apparatuses $90_1$ and $90_2$ and records the result in the server system 8 again.

However, the server system 8 shown in FIG. 1 is not always suitable for recording and reproducing the high quality audio and/or video data of a television broadcasting station. The reason for this will be explained below.

First, if the server system 8 were to handle the high quality audio and/or video data of a level as used in a television broadcasting station, the data transfer capability of its bus would be insufficient and the system size or an expansion property of the system would be limited.

That is, the data rate of the current digital format of the television audio and/or video data is 100 Mbps or more.

Also, the coded audio and/or video data obtained by high efficient coding of this audio and/or video data has a data rate of about 30 Mbps (4 MBps), as disclosed in for example the CCIR recommendation 723, taking the deterioration due to the editing into account.

For example, if trying to allow eight editors to simultaneously perform editing (so-called AB roll editing) using two stock videos of 30 Mbps (4 MBps) in the server system 8, when taking the necessity of buffering the audio and/or video data as mentioned above into account, as much as 48 [=3 (due to the necessity of simultaneously reproducing two stock videos and recording one video after editing)×2 (reciprocation for buffering)×8 (number of editors)] series of coded audio and/or video data would be simultaneously transferred on the high speed bus 404. Accordingly, an effective data transfer rate of 192 Mbps a the lowest would be required for just the transfer of the coded audio and/or video data to the high speed bus 404.

Further, when transferring the audio and/or video data to the input/output interfaces $407_n$, there is a limitation inherent in the server system 8 in a television broadcasting station that no instantaneous disconnection may occur. Therefore, there also arises a problem of the processing capability of the CPU 401 controlling the high speed bus 404 and the RAM 403. In addition, the physical transfer speed of the bus in a high performance computer is usually about 100 Mbps. According to the configuration of the server system 8 shown in FIG. 1, realization of editing in which as many as about eight editors can share the use of the stock video is not always technically easy.

Further, when realizing a server system useable in a television broadcasting station, the server system must be brought into slave synchronization with a synchronization signal or time stamp supplied from the outside.

Usually, the transmission and reception of audio and/or video data between the broadcasting equipment in a television broadcasting station are carried out in strict synchronization with a reference synchronization signal or time code for the audio and/or video data.

Accordingly, to connect the already existing broadcasting apparatuses with a server system, it is necessary to input and output (input/output) the audio and/or video data of the server system in synchronization with the reference synchronization signal or the like. However, in a server system 8, which performs the transfer of audio and/or video data by using a basically asynchronously operating computer, it is not always easy to input/output the audio and/or video data in synchronization with a reference synchronization signal or time code.

That is, in the server system 8 having the configuration shown in FIG. 1, when the transfer and exchange (routing) of the audio and/or video data are carried out by using the asynchronous high speed bus 404 and RAM 403, after the audio and/or video data to be originally transmitted in synchronization with the reference synchronization signal etc. have passed through the asynchronous transfer system inside the server system 8, synchronous/asynchronous conversion processing for bringing the same into synchronization with the external reference synchronization signal again becomes necessary. Therefore, the size of the apparatus becomes larger and also the manufacturing cost rises.

Further, in the editing system 9 shown in FIG. 2, each of the editing apparatuses $90_1$ and $90_2$ must be provided with all of the data processing means for the editing. Provision, for example, of an expensive data processing means which is rarely used in each of the editing apparatuses $90_1$ and $90_2$ raises the cost of the editing apparatuses $90_1$ and $90_2$.

The server system 8 and the editing system 9 shown in FIG. 1 suffer from the problems as mentioned above. It is necessary to find measures to solve these problems.

SUMMARY OF THE INVENTION

The main object of the present invention is to provide in a broadcasting system of a television broadcasting station, audio and/or video data recording and reproduction apparatus whereby the size and functions of the server system for the audio and/or video data can be changed in accordance with the size of operations of the individual television broadcasting station or the type of operations to which the broadcasting system is applied in the same television broadcasting station, the change of the functions and configuration is easy, the expandability is high, and the cost is low.

Further, another object of the present invention is to provide an audio and/or video data recording and reproduction apparatus which can supply the audio and/or video data serving as stock for a plurality of editing apparatuses in an editing system, can record the edited data, and in addition enables shared use of an expensive data processing means for editing among these editing apparatuses and consequently can lower the cost of the editing apparatus.

To attain the above objects, the video data recording and reproduction apparatus of the present invention having: a recording and reproducing means for recording and reproducing video data with respect to a storage medium; a plurality of input/output control means for receiving a control signal from an external apparatus and inputting and outputting the video data between the recording and reproducing means and the external apparatus based on the control signal; and a data processing means for performing predetermined special effect processing on the received video data based on the control signal received from the external apparatus via the input/output control means and supplying the processed video data to the recording and reproducing means.

Preferably the recording and reproducing means responds to the control signal from the external apparatus via the input/output control means and supplies to the data processing means, data indicating the area on the storage medium in which video data to be reproduced is stored and the data indicating the area on the storage medium in which video data processed by the special effect processing by the data processing means is stored and the data processing means makes the recording and reproducing means reproduce the video data based on the received data indicating the area and make the recording and reproducing means store the video data processed by the predetermined special effect processing to the storage medium.

Further, preferably the data processing means makes the recording and reproducing means store only the video data in a video period processed by the predetermined special effect processing.

Further, preferably when the input/output control means receives a request for reproduction of video data processed by the predetermined special effect processing from the external apparatus, the recording and reproducing means reproduces the video data in a video period processed by the predetermined special effect processing and the video data to be assigned forward and backward thereof based on the data indicating the area received from the recording and reproducing means.

Further, to attain the above objects, the audio and/or video data recording and reproduction apparatus of the present invention having: a recording and reproducing means for recording and reproducing audio and/or video data with respect to the storage medium; a plurality of input/output control means for receiving a control signal from an external apparatus respectively and inputting and outputting the audio and/or video data between the recording and reproducing means and the external apparatus based on the control signal; and a data processing means for performing predetermined special effect processing on the received audio and/or video data based on the control signal received from the external apparatus via the input/output control means and supplying the processed audio and/or video data to the recording and reproducing means.

BRIEF DESCRIPTION OF THE DRAWINGS

The above-mentioned objects and features and other objects and features of the present invention will be more apparent from the following description given with reference to the accompanying drawings, wherein.

DESCRIPTION OF THE PREFERRED EMBODIMENTS

Below, a first embodiment of the present invention will be explained.

Figure 3:
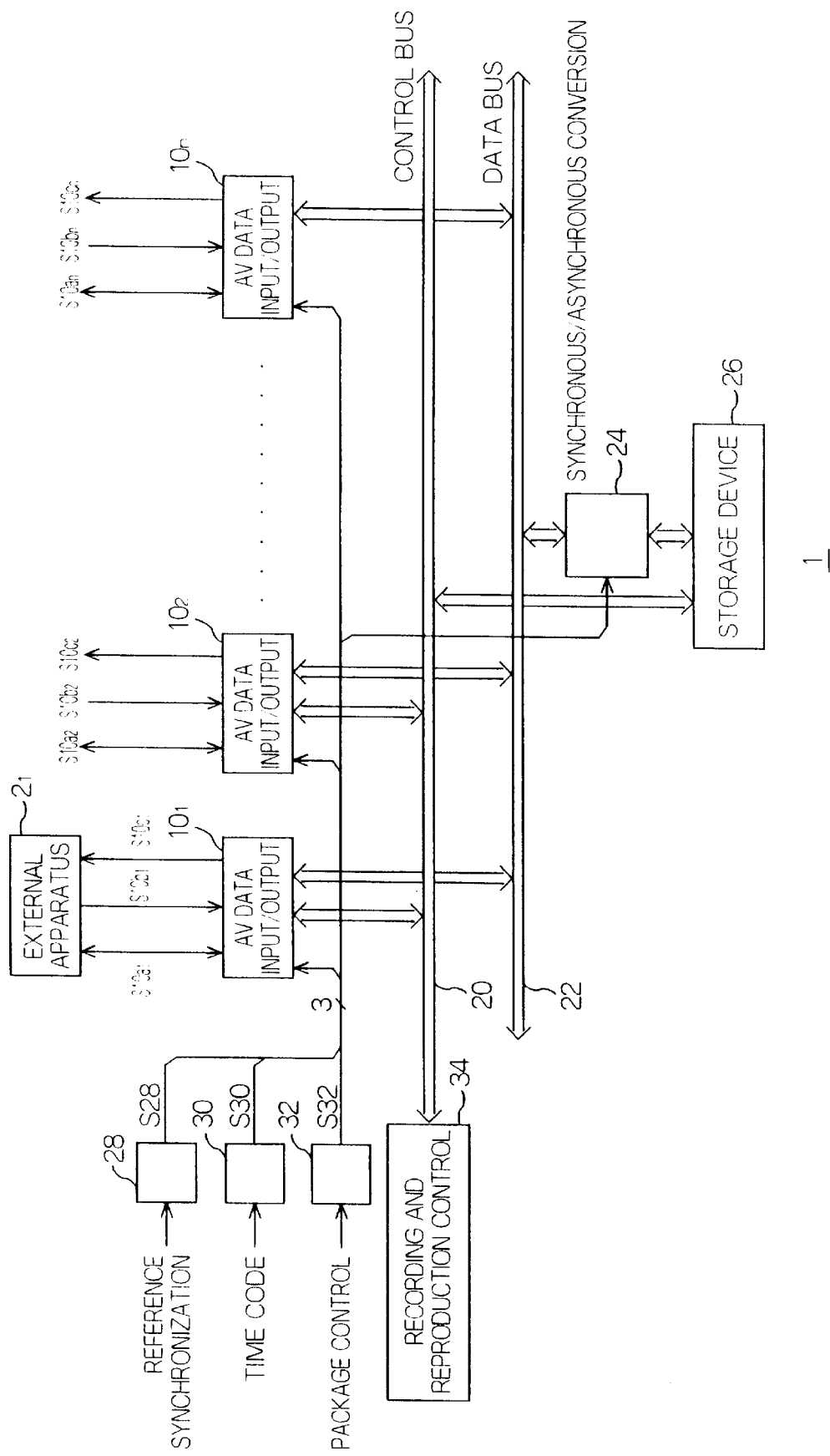
FIG. 3 is a view of the configuration of a data recording and reproduction apparatus according to a first embodiment of the present invention.

FIG. 3 is a view of the configuration of a data recording and reproduction apparatus 1 according to a first embodiment of the present invention.

As shown in FIG. 3, the data recording and reproduction apparatus 1 is constituted by n number of audio and/or video data input/output control circuits (AV data input/output control circuits) $10_1$ to $10_n$, a recording and reproduction control circuit 34, a synchronous/asynchronous conversion circuit 24, a storage device 26 having a hard disk array, a synchronization signal interface circuit (synchronization signal IF circuit) 28, a time code interface circuit (TCIF circuit) 30, a multiplexing control interface circuit (multiplexing IF circuit) 32.

In the data recording and reproduction apparatus 1, the AV data input/output control circuits $10_1$ to $10_n$ and the synchronous/asynchronous conversion circuit 24 are connected to each other via a data bus 22, while the recording and reproduction controlling circuit 34, the AV data input/output control circuits $10_1$ to $10_n$, and the storage device 26 are connected to each other via a control bus 20.

Further, the AV data input/output control circuits $10_1$ receive as input a reference synchronization signal S28 from the outside, for example, an external apparatus 2 (host controller system) such as an editing device via the synchronization signal IF circuit 28 according to need, receive as input a time code S30 indicating the time of the audio and/or video data and used for the establishment of synchronization via the TCIF circuit 30, and receive as input a package control signal S32 controlling the operation of the AV data input/output controlling circuits $10_1$ to $10_n$ all together via the multiplexing IF circuit 32.

Further, the data recording and reproduction apparatus 1 can transfer the audio and/or video data on the data bus 22 in synchronization with the reference synchronization signal and time code etc. input from the outside. Further, package input/output control with respect to a plurality of audio and/or video data becomes possible by connecting a host application system such as an editing apparatus via the AV data input/output control circuits $10_1$ to $10_n$.

By these component parts, the data recording and reproduction apparatus 1 disperses the load of the input/output control and the recording and reproduction control regarding the audio and/or video data, simultaneously inputs and outputs the audio and/or video data of multiple channels, and records and reproduces the same.

Figure 4:
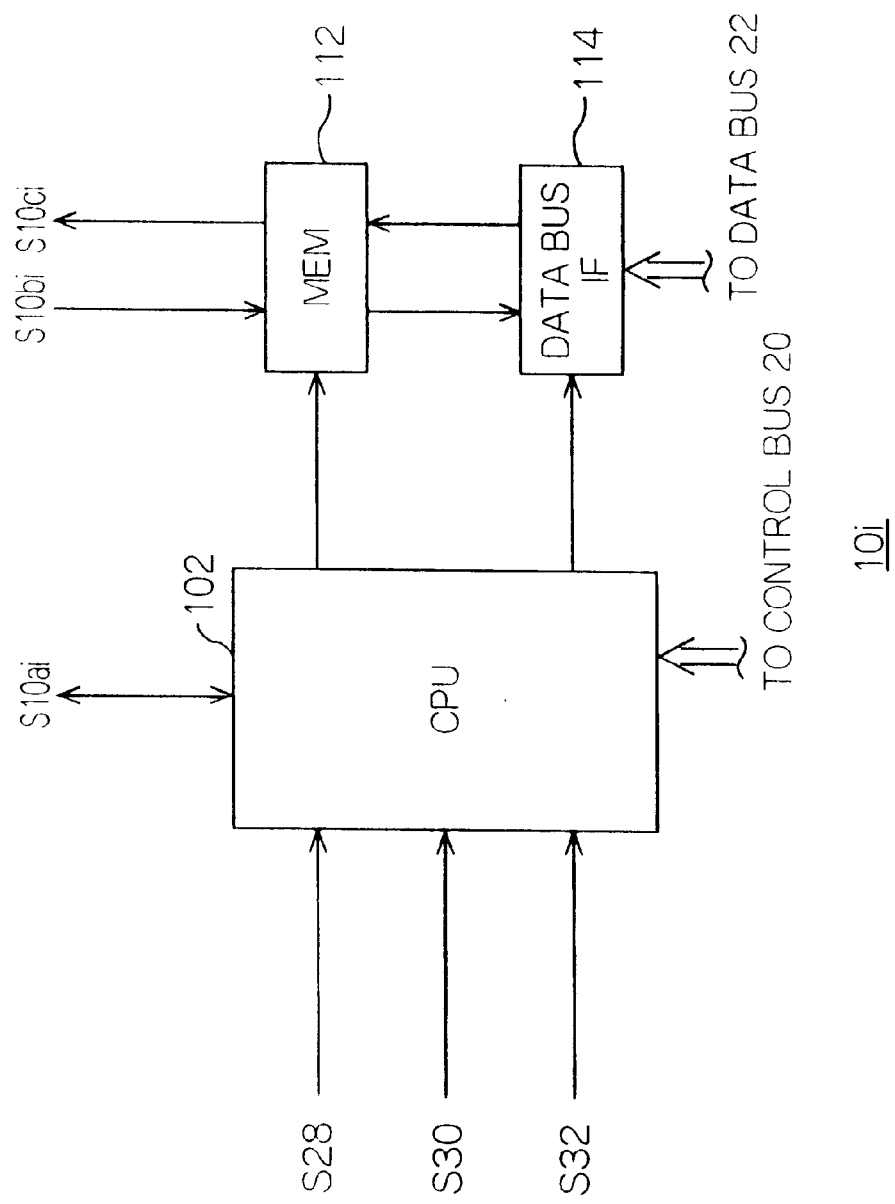
FIG. 4 is a view of the configuration of a first AV data input/output circuit.

FIG. 4 is a view of the configuration of the first AV data input/output control circuits $10_i$ (i is integer; $1 \leq i \leq n$, same below).

Where noncompressed audio and/or video data are input and output between the external apparatus 2 and the storage device 26, as shown in FIG. 4, use is made of the first AV data input/output control circuits $10_i$ each constituted by a microprocessor (CPU) 102, a memory circuit (MEM) 112, and a data bus interface circuit (data bus IF) 114.

In such a AV data input/output control circuit $10_i$, the microprocessor 102 is constituted by a single chip microprocessor etc. including a ROM storing for example the programs.

Further, the microprocessor 102 transmits and receives the control signals $S10a_i$ with the external apparatus 2 and transmits and receives the control signals with the recording and reproduction controlling circuit 34 via the control bus 20.

Further, the microprocessor 102 controls the operation of the memory circuit 112 and the data bus IF 114 to control the input/output of the audio and/or video data between the external apparatus 2 and the storage device 26 based on the control signal input from the recording and reproduction control circuit 34, the control signals $S10a_i$ input from the external apparatus 2, and, if necessary, the reference synchronization signal S28, reference synchronization signal S28 input via the TCIF circuit 30 and the multiplexing IF circuit 32, the time code S30, and the package control signal S32.

The data bus IF 114 inputs and outputs the audio and/or video data via the data bus 22 with the storage device 26 under the control of the microprocessor 102. That is, it outputs the audio and/or video data buffered in the memory circuit 112 to the storage device 26 (synchronous/asynchronous conversion circuit 24) and outputs the audio and/or video data input from the storage device 26 to the data memory circuit 112.

The memory circuit 112 buffers the audio and/or video data $S10b_i$ input from the external apparatus 2 under the control of the microprocessor 102 and outputs the same via the data bus IF 114 to the storage device 26 (synchronous/asynchronous conversion circuit 24).

Further, the memory circuit 112 buffers the audio and/or video data input from the storage device 26 via the data bus IF 114 and outputs the same as the audio and/or video data $S10c_i$ to the external apparatus 2.

Referring to FIG. 3 again, the component parts of the data recording and reproduction apparatus 1 other than the AV data input/output control circuits $10_i$ will be explained.

The recording and reproduction control circuit 34 transmits and receives the control signal with the AV data input/output control circuits $10_i$, the synchronous/asynchronous conversion circuit 24, and the storage device 26 via the control bus 20 to control the operation of these component parts.

Further, the recording and reproduction controlling circuit 34 manages the recording regions of the storage device 26, determines the recording region of the storage device 26 in which the audio and/or video data are to be recorded when it receives a recording request signal of the audio and/or video data with respect to the storage device 26 from an AV data input/output control circuit $10_i$, and notifies this to the AV data input/output control circuit $10_i$, while when the reproduction request signal of the audio and/or video data recorded in the storage device 26 is requested from the AV data input/output control circuit $10_i$, searches for the recording region of the storage device 26 in which the audio and/or video data to be reproduced are recorded and notifies the found recording region to the AV data input/output control circuit $10_i$.

The synchronization signal IF circuit 28 receives the reference synchronization signal such as a house clock used for establishing synchronization of the broadcast apparatus in the television broadcasting station in synchronization with the audio and/or video data $10b_i$ and $10c_i$ handled by the external apparatus 2 and supplies the same as the reference synchronization signal S28 to the AV data input/output control circuits $10_i$ and the synchronous/asynchronous conversion circuit 24.

The TCIF circuit 30 receives a time code which is input from the outside such as the external apparatus 2, indicates the elapsed time or display time of the audio and/or video data etc., and is used for establishing synchronization between the audio and video in the external apparatus 2 and supplies the same as the time code S30 to the AV data input/output control circuits $10_i$ and the synchronous/asynchronous conversion circuit 24.

The multiplexing IF circuit 32 receives the package control signal which is input from the outside such as the external apparatus 2, instructs the same processing content with respect to all of the AV data input/output control circuits $10_1$ to $10_n$, and controls them together and supplies this as the package control signal S32 to the AV data input/output control circuits $10_1$ to $10_n$.

The synchronous/asynchronous conversion circuit 24 is used where data transfer in synchronization with the reference synchronization signal S28 or the time code S30 is carried out on the data bus 22, asynchronously records the audio and/or video data input from the AV data input/output control circuits $10_i$ via the data bus 22 in synchronization with these signals in the storage device 26, and outputs the audio and/or video data asynchronously reproduced by the storage device 26 to the AV data input/output control circuits $10_i$ via the data bus 22 in synchronization with these signals.

The storage device 26 records the audio and/or video data input from the AV data input/output control circuits $10_i$ via the data bus 22 and the synchronous/asynchronous conversion circuit 24 on the predetermined recording medium, for example, a hard disc, magnetic-optical disc, or semiconductor memory. under the control of the recording and reproduction control circuit 34 via the control bus 20 and reproduces the recorded audio and/or video data and outputs the same to the AV data input/output control circuits $10_i$ via the synchronous/asynchronous conversion circuit 24 and the data bus 22.

Below, the operation of the data recording and reproduction apparatus 1 will be explained.

Figure 5:
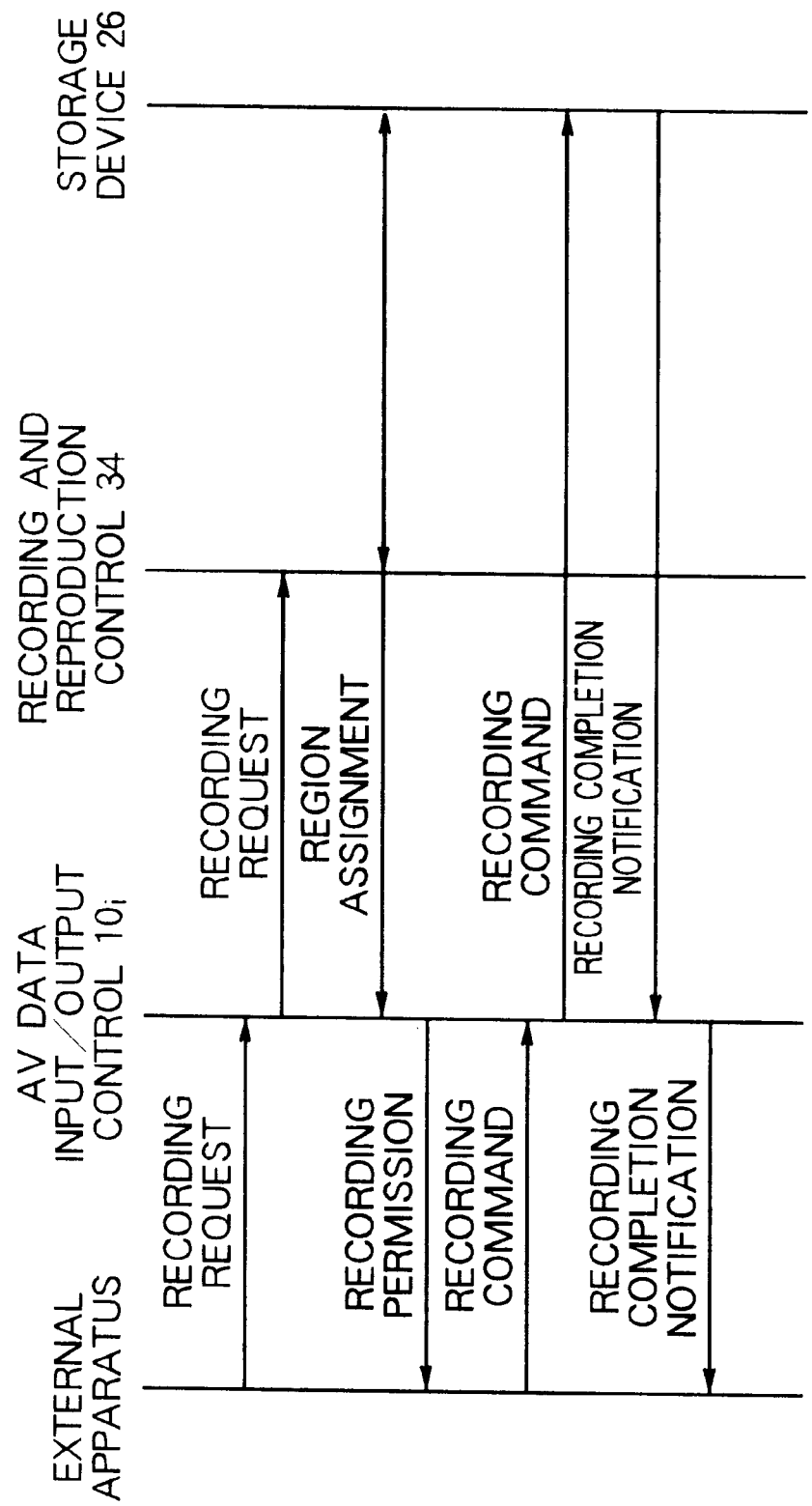
FIG. 5 is a view of a signal sequence between component parts of a data recording and reproduction apparatus where the audio and/or video data Are recorded in a storage device shown in FIG. 3.

FIG. 5 is a view of the signal sequence between component parts of the data recording and reproduction apparatus 1 where the audio and/or video data are recorded in the storage device 26. Note that, in FIG. 5, exceptional processing such as a case where there is no empty recording region in the storage device 26 is omitted for the simplification of the explanation.

As shown in FIG. 5, the recording request signal is output from the external apparatus 2 to an AV data input/output control circuit $10_i$ as the control signal $S10a_i$.

The AV data input/output control circuit $10_i$ receiving the recording request signal outputs the recording request signal to the recording and reproduction control circuit 34 via the control bus 20.

The recording and reproduction control circuit 34 receiving the recording request signal searches for an empty recording region of the storage device 26 and outputs the region assignment signal indicating the recording region assigned to the audio and/or video data for which the recording was requested to the AV data input/output control circuit $10_i$ and the storage device 26.

The AV data input/output control circuit $10_i$ receiving the region assignment signal outputs a recording enable signal to the external apparatus 2 as the control signal $S10a_i$.

The external apparatus 2 receiving the recording enable signal outputs a recording command signal to the AV data input/output control circuit $10_i$, and the AV data input/output control circuit $10_i$ outputs the recording command signal received to the storage device 26 via the control bus 20.

Further, the external apparatus 2 outputs the real time audio and/or video data $S10b_i$ (not illustrated in FIG. 5) for which the recording is requested to the storage device 26 to the AV data input/output control circuit $10_i$.

The audio and/or video data $S10b_i$ output by the external apparatus 2 is recorded in the storage device 26 via the AV data input/output control circuit $10_i$ and the data bus 22.

When the audio and/or video data are recorded in all of the recording regions assigned by the recording and reproduction control circuit 34, the storage device 26 outputs a recording completion notification signal to the AV data input/output control circuit $10_i$ via the control bus 20.

The AV data input/output control circuit $10_i$ receiving the recording completion notification signal outputs the recording completion notification signal to the external apparatus 2.

Figure 6:
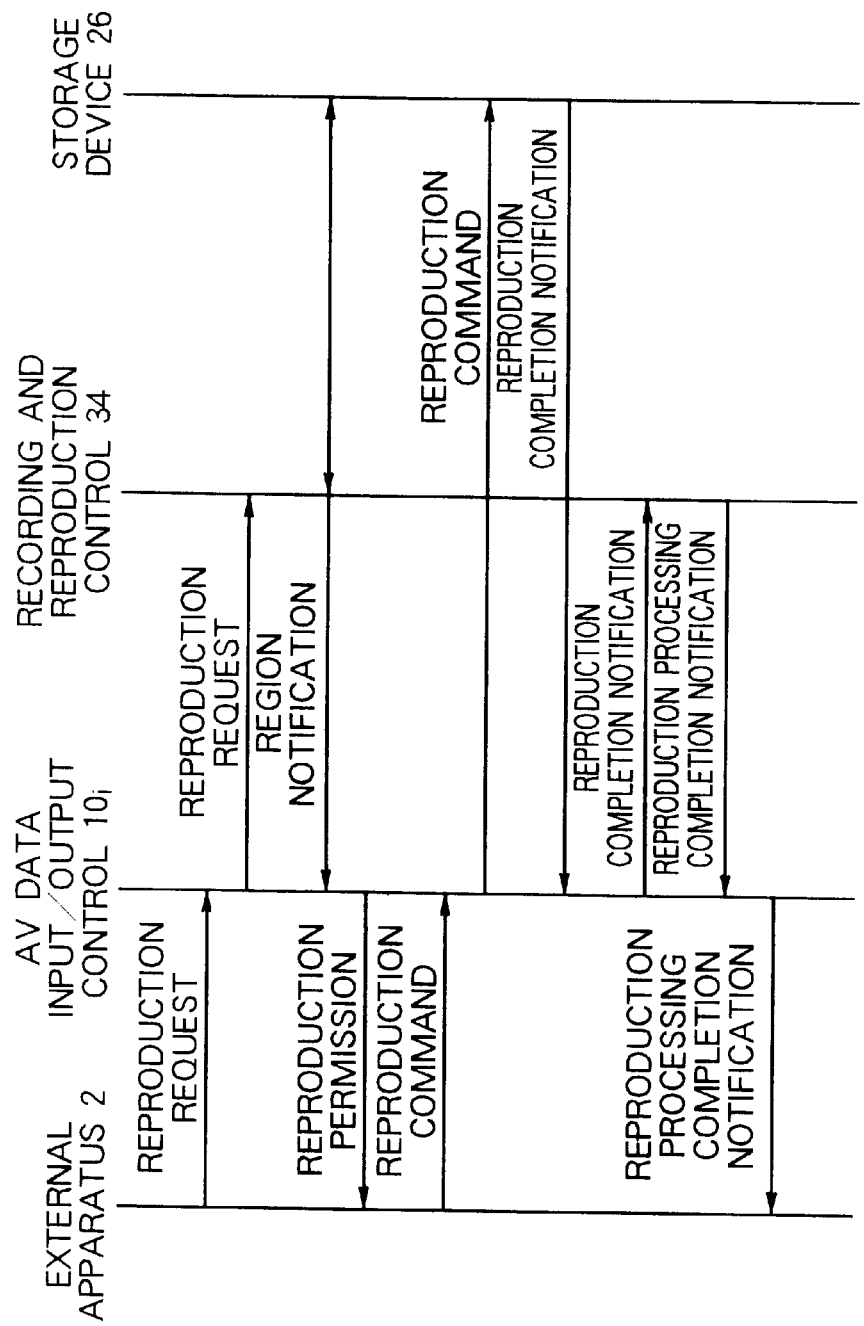
FIG. 6 is a view of the signal sequence between structural parts of the data recording and reproduction apparatus where the audio and/or video data recorded in the storage device are reproduced.

FIG. 6 is a view of the signal sequence between the component parts of the data recording and reproduction apparatus 1 where the audio and/or video data recorded in the storage device 26 are reproduced. Note that, in FIG. 6, for the simplification of explanation, exceptional processing such as a case where the audio and/or video data for which the reproduction was requested are not recorded in the storage device 26 is omitted.

As shown in FIG. 6, the external apparatus 2 outputs the reproduction request signal requesting the reproduction of the audio and/or video data recorded in the storage device 26 to an AV data input/output control circuit $10_i$ as the control signal $S10a_i$.

The AV data input/output control circuit $10_i$ receiving the reproduction request signal outputs the reproduction request signal to the recording and reproduction control circuit 34 via the control bus 20.

The recording and reproduction control circuit 34 receiving the reproduction request signal searches for the region of the storage device 26 in which the audio and/or video data for which the reproduction was requested is recorded and outputs a region notification signal indicating the found recording region to the AV data input/output control circuit $10_i$ and the storage device 26 via the control bus 20.

The AV data input/output control circuit $10_i$ receiving the region notification signal outputs a reproduction enable signal as the control signal $10a_i$ to the external apparatus 2.

The external apparatus 2 receiving the reproduction enable signal outputs a reproduction command signal as the control signal $S10a_i$ to the AV data input/output control circuit $10_i$, and the AV data input/output control circuit $10_i$ receiving the reproduction command signal outputs the reproduction command signal via the control bus 20 to the storage device 26.

The storage device 26 receiving the reproduction command signal reproduces the audio and/or video data for which the reproduction was requested from the recording region indicated by the region notification signal received from the recording and reproduction control circuit 34 and outputs this to the AV data input/output control circuit $10_i$ via the data bus 22.

The AV data input/output control circuit $10_i$ outputs the audio and/or video data received from the storage device 26 as the audio and/or video data $S10c_i$ to the external apparatus 2 (not illustrated in FIG. 6).

The storage device 26 outputs the reproduction completion notification signal to the AV data input/output control circuit $10_i$ via the control bus 20 when terminating the reproduction of all of the audio and/or video data from the recording region indicated by the region notification signal received from the recording and reproduction control circuit 34.

The AV data input/output control circuit $10_i$ receiving the reproduction completion notification signal outputs the reproduction completion notification to the recording and reproduction control circuit 34 via the control bus 20.

The recording and reproduction control circuit 34 receiving the reproduction completion notification signal outputs the reproduction completion recognition notification signal to the AV data input/output control circuit $10_i$ via the control bus 20.

The AV data input/output control circuit $10_i$ receiving the reproduction completion recognition notification outputs the reproduction processing completion notification signal to the external apparatus 2 as the control signal $S10a_i$.

Note that, where the same control signal (package control signal S32) is input to all of the AV data input/output control circuits $10_1$ to $10_n$ from the outside such as the external apparatus 2 via the multiplexing IF circuit 32, all of the AV data input/output control circuits $10_1$ to $10_n$ perform the same recording or reproduction operation.

Further, where the AV data input/output control circuits $10_1$ to $10_n$ and the synchronous/asynchronous conversion circuit 24 are controlled so that the reference synchronization signal S28 or the time code S30 is input from the synchronization signal IF circuit 28 or the TCIF circuit 30 and the recording and reproduction control circuit 34 performs the data transfer in synchronization with the reference synchronization signal S28 or the time code S30, the transfer of the audio and/or video data on the data bus 22 is carried out in synchronization with these signals.

Below, a second embodiment of the present invention will be explained.

Figure 7:
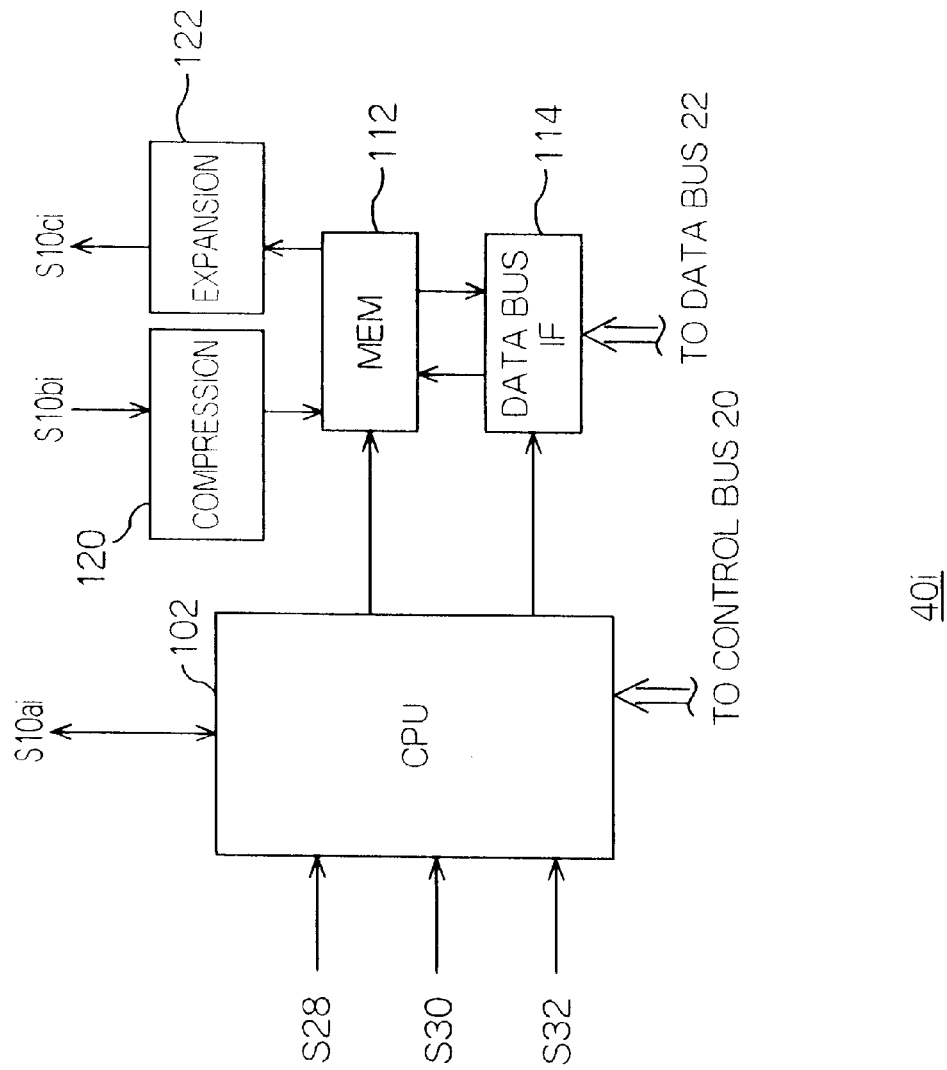
FIG. 7 is a view of the configuration of an AV data input/output control circuit according a second embodiment of the present invention.

FIG. 7 is a view of the configuration of a AV data input/output control circuit $40_i$ according to a second embodiment of the present invention.

As shown in FIG. 7, the AV data input/output control circuit $40_i$ has a structure obtained by adding a compressing and coding circuit 120 and an expanding and decoding circuit 122 between the memory circuit 112 of the AV data input/output control circuit $10_i$ shown in FIG. 4 and the external apparatus 2.

The AV data input/output control circuit $40_i$ is used in place of the AV data input/output control circuit $10_i$ to input and output the noncompressed audio and/or video data $10b_i$ and $10c_i$ with the external apparatus 2 in the data recording and reproduction apparatus 1 shown in FIG. 3 and records and reproduces the compressed and coded audio and/or video data with respect to the storage device 26.

The compressing and coding circuit 120 compresses and codes the noncompressed audio and/or video data $S10b_i$ input from the external apparatus 2 by a compressing and coding system such as the MPEG and outputs the resultant data to the memory circuit 112.

The expanding and decoding circuit 122 expands and decodes the compressed and coded audio and/or video data input from the data bus IF 114 and outputs the resultant data as the audio and/or video data $S10c_i$ to the external apparatus 2.

Below, the operation of the data recording and reproduction apparatus 1 using the AV data input/output control circuit $40_i$ in place of the AV data input/output control circuit $10_i$ will be simply explained.

By the signal sequence shown in FIG. 5, the noncompressed audio and/or video data input from the external apparatus 2 to the compressing and coding circuit 120 are compressed and coded by the compressing and coding circuit 120, output to the storage device 26 via the memory circuit 112 and the data bus IF 114, and recorded on the predetermined recording medium by the storage device 26.

Further, by the signal sequence shown in FIG. 6, the compressed audio and/or video data reproduced from the storage device 26 are input to the expanding and decoding circuit 122 via the data bus IF 114 and the memory circuit 112, expanded and decoded, and then output to the external apparatus 2.

By providing the compressing and coding circuit 120 and the expanding and decoding circuit 122 in the AV data input/output control circuit $40_i$, the audio and/or video data $S10_i$ input as the audio and/or video data of the base band can be compressed and coded and recorded in the storage device 26 and the compressed audio and/or video data reproduced by the storage device 26 can be output as the audio and/or video data $S10c_i$ of the base band to the external apparatus 2.

Note that, it is also possible to constitute the compressing and coding circuit 120 and the expanding and decoding circuit 122 to handle either of the audio data or the video data.

Further, where synchronous data transfer in the control bus 20 is not necessary, it is also possible to omit the synchronous/asynchronous conversion circuit 24 or to stop the operation of the synchronous/asynchronous conversion circuit 24.

Below, a third embodiment of the present invention will be explained.

Figure 2:
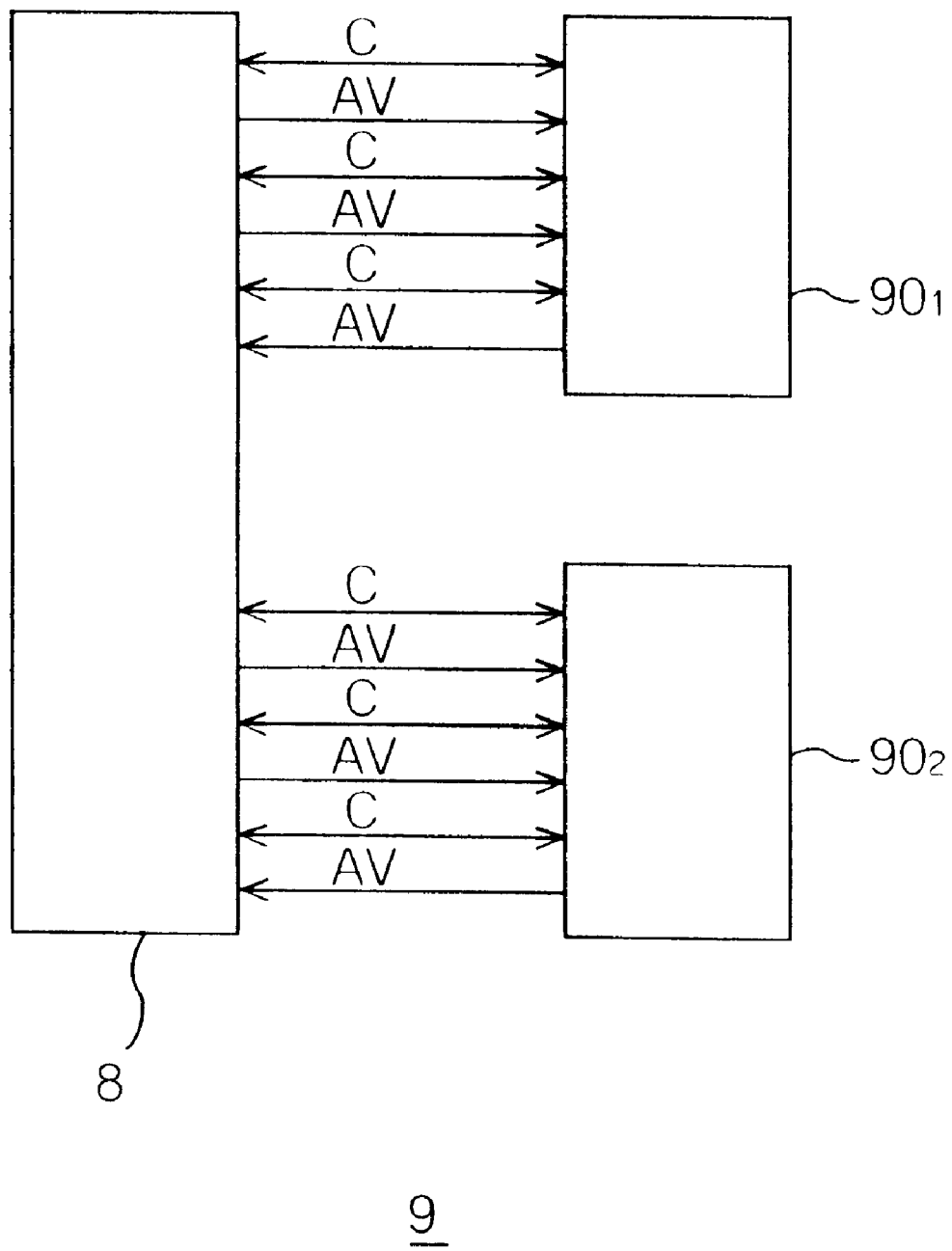
FIG. 2 is a view of an example of a conventional editing system for audio and/or video data.

It is possible to constitute a similar editing system to the editing system 9 shown in FIG. 2 even using the data recording and reproduction apparatus 1 shown in the first embodiment. In the editing system 9 shown in FIG. 2, however, all editing apparatuses must be provided with all of the data processing means.

The data recording and reproduction apparatus 3 shown in the third embodiment was made so as to solve such a problem and adopts a configuration in which a data processing circuit 60 is added to the data recording and reproduction apparatus 1 so that the data processing circuit 60 can be used in common among a plurality of external apparatuses 2 such as editing apparatuses.

Figure 1:
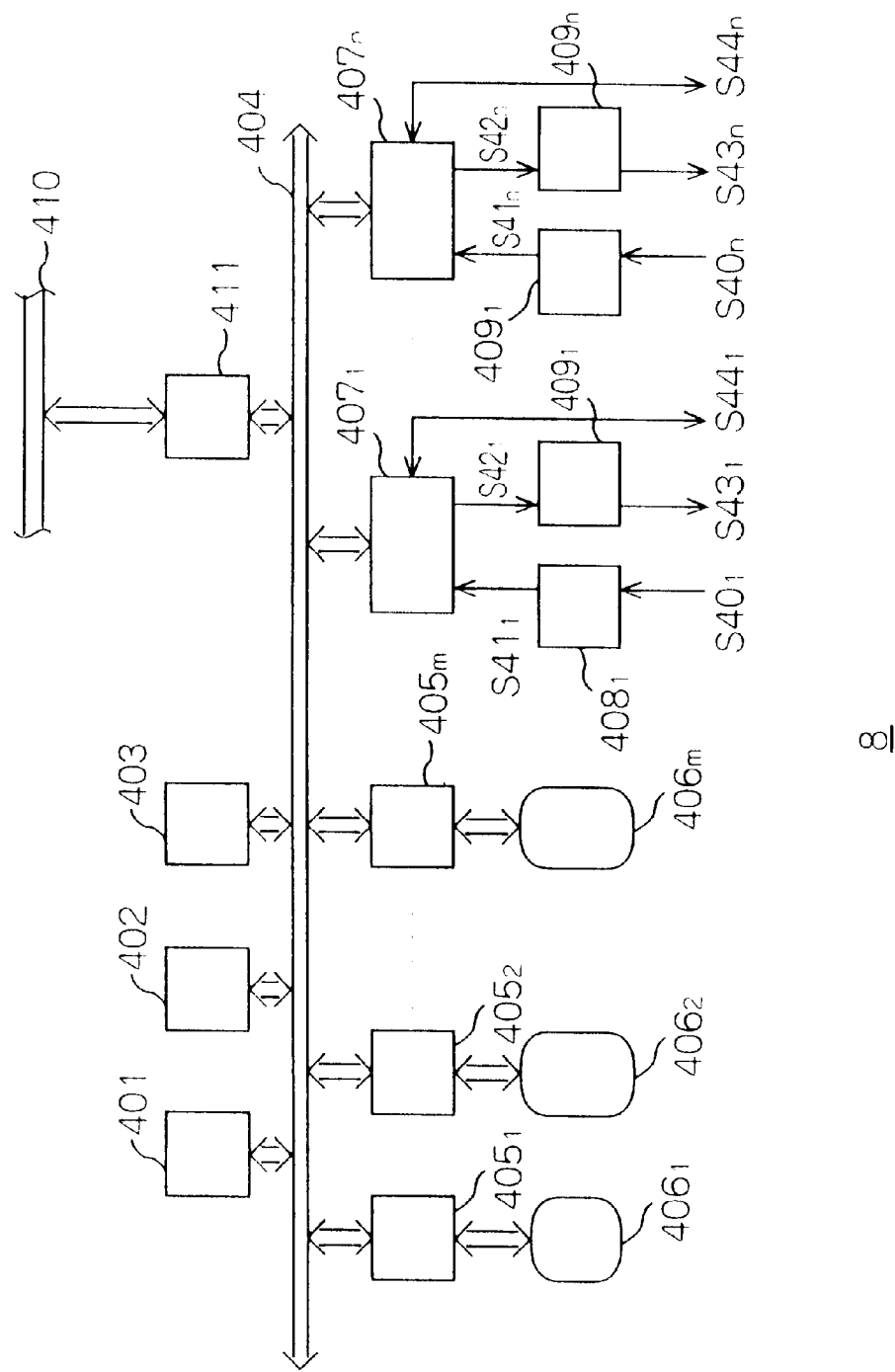
FIG. 1 is a view of an example of a conventional server system for audio and/or video data.
Figure 8:
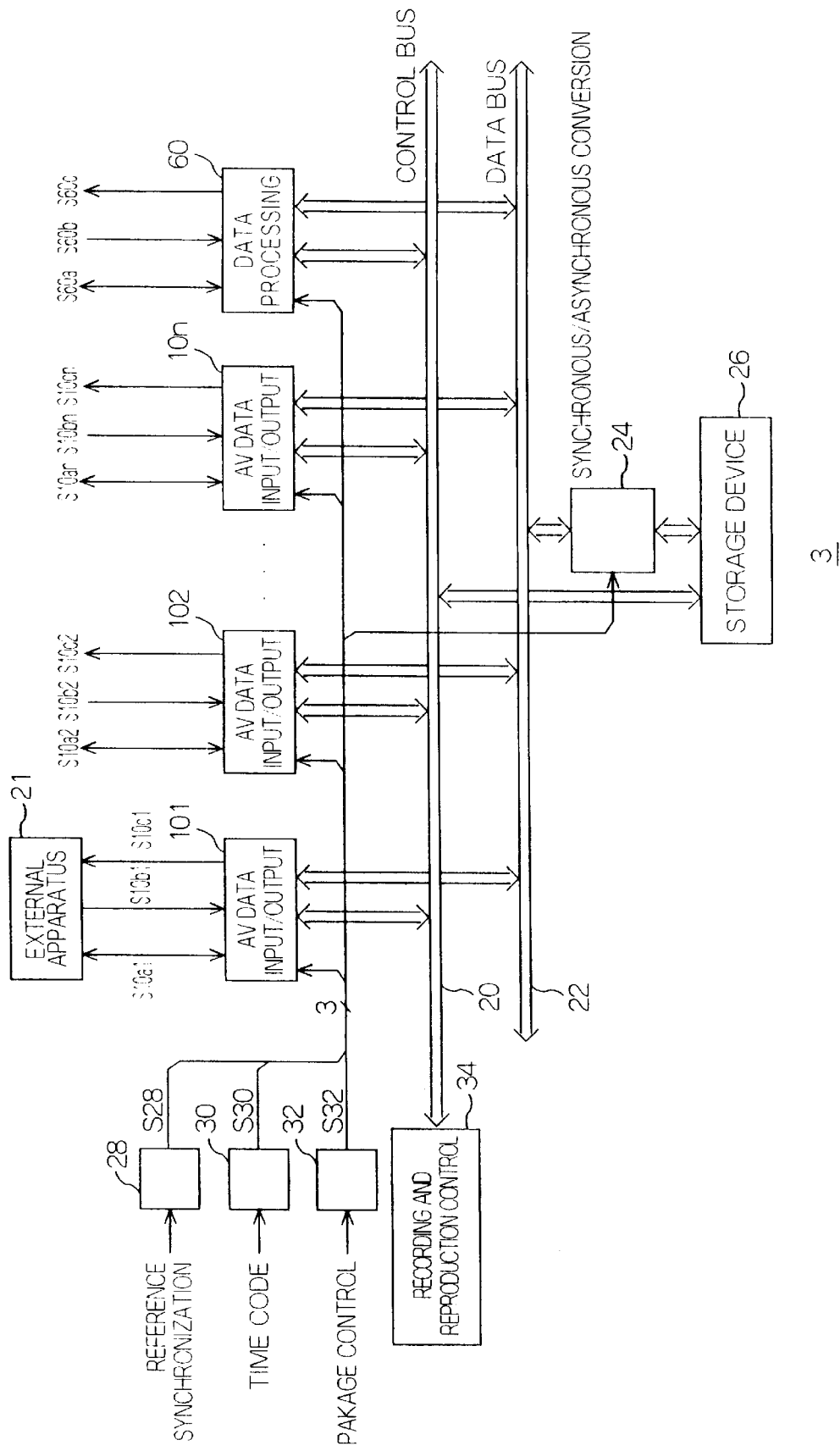
FIG. 8 is a view of the configuration of a data recording and reproduction apparatus according to a third embodiment of the present invention.

FIG. 8 is a view of the configuration of a data recording and reproduction apparatus 3 according to a third embodiment of the present invention. Note that, among the component parts of the data recording and reproduction apparatus 3 shown in FIG. 8, the same component parts as those of the data recording and reproduction apparatus 1 shown in FIG. 1 are given the same reference numerals.

As shown in FIG. 8, the data recording and reproduction apparatus 3 has, as the same component parts as those of the data recording and reproduction apparatus 1 shown in the first embodiment and the second embodiment, n number of AV data input/output control circuits $10_1$ to $10_n$ for the audio and/or video data, a recording and reproduction control circuit 34, a synchronous/asynchronous conversion circuit 24, a storage device 26, a synchronization signal IF circuit 28, a TCIF circuit 30, and a multiplexing IF circuit 32. Further, the data recording and reproduction apparatus 3 has an AV data processing circuit 60 as a different component part from that of the data recording and reproduction apparatus 1 shown in the first embodiment and the second embodiment.

In the data recording and reproduction apparatus 3, the AV data processing circuit 60 performs a predetermined processing with respect to the audio and/or video data reproduced from the storage device 26, for example, a special effect processing such as processing for making the boundary of the two scenes in the audio and/or video data comprising of two scenes appear to gradually shift from the video before the boundary to the video after the boundary.

Note that, the AV data processing circuit 60 is connected to the synchronous/asynchronous conversion circuit 24 via the data bus 22 in the same way as the AV data input/output control circuits $10_1$ to $10_n$. Further, the AV data processing circuit 60 is connected to the recording and reproduction control circuit 34 and the storage device 26 via the control bus 20.

Further, the AV data processing circuit 60 receives as input the reference synchronization signal S28 from the external apparatus 2 via the synchronization signal IF circuit 28 according to need in the same way as the AV data input/output control circuits $1_{-1}$ to $10_n$.

Further, the AV data processing circuit 60 receives as input a time code S30 which indicates the time of the audio and/or video data used for the establishment of synchronization via the TCIF circuit 30.

Further, the AV data processing circuit 60 receives as input the package control signal S32 via the multiplexing IF circuit 32 which is used for controlling the operations of the AV data input/output control circuits $10_1$ to $10_n$ and the AV data processing circuit 60 together.

In this way, in the data recording and reproduction apparatus 3, transfer of the audio and/or video data on the data bus 22 in synchronization with the reference synchronization signal and time code etc. input from the outside is possible.

Figure 9:
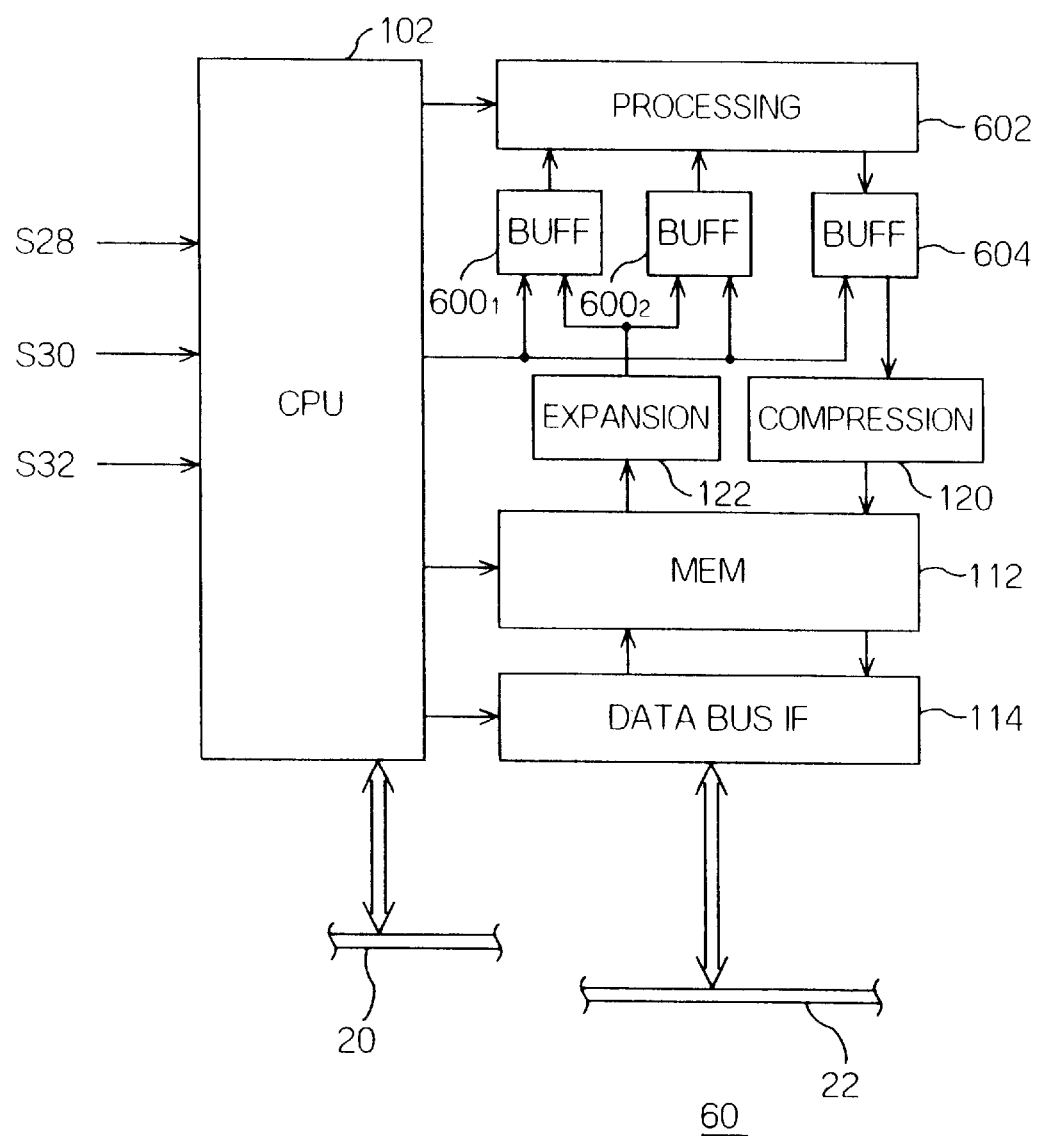
FIG. 9 is a view of the configuration of an AV data processing circuit for compressed audio and/or video data of a third embodiment.

FIG. 9 is a view of the configuration of the AV data processing circuit 60 for the compressed audio and/or video data in the third embodiment. Note that, among the component parts of the AV data processing circuit 60 shown in FIG. 9, the same component parts as those of the AV data input/output control circuits $10_1$ to $10_n$ shown in FIG. 4 are given the same reference numerals.

The data processing circuit 60 is used where the audio and/or video data compressed and coded by the storage device 26 are recorded and reproduced. As shown in FIG. 9, the data processing circuit 60 is constituted by a microprocessor 102, a memory circuit 112, a data bus IF 114, a compressing circuit 120, an expanding circuit 122, buffer circuits $600_1$ and $600_2$, a processing circuit 602, and a buffer circuit 604. The data processing circuit 60 once expands and decodes the compressed audio and/or video data reproduced in the storage device 26 by these component parts, performs the predetermined processing, compresses and encodes the same again, and records the resultant data in the storage device 26.

The buffer circuits $600_1$ and $600_2$ constitute a double buffer and buffer the noncompressed audio and/or video data expanded and decoded by the expanding circuit 122 under the control of the microprocessor 102. That is, for example the buffer circuits $600_1$ and $600_2$ buffer two different series of audio and/or video data to be edited by the buffer circuits $600_1$ and $600_2$, while the processing circuit 602 performs the processing such as fade-in and fade-out etc. with respect to the audio and/or video data buffered by the buffer circuits $600_1$ and $600_2$. Note that, as this processing, in addition to fade-in and fade-out, there are the processings such as wiping, dissolving and mixing.

The processing circuit 602 performs predetermined processing with respect to the noncompressed audio and/or video data input from the buffer circuits $600_1$ and $600_2$, such as special effect processing for making, for example, the boundary of the audio and/or video data obtained as the result of the editing appear to gradually shift from the video (A) before the boundary to the video (B) after the boundary (such processing will be also referred to as fade-in and fade-out).

The buffer circuit 604 buffers the audio and/or video data subjected to the predetermined processing by the processing circuit 602 and matches the timing of input and output of the audio and/or video data between the processing circuit 602 and the memory circuit 112.

Figure 10:
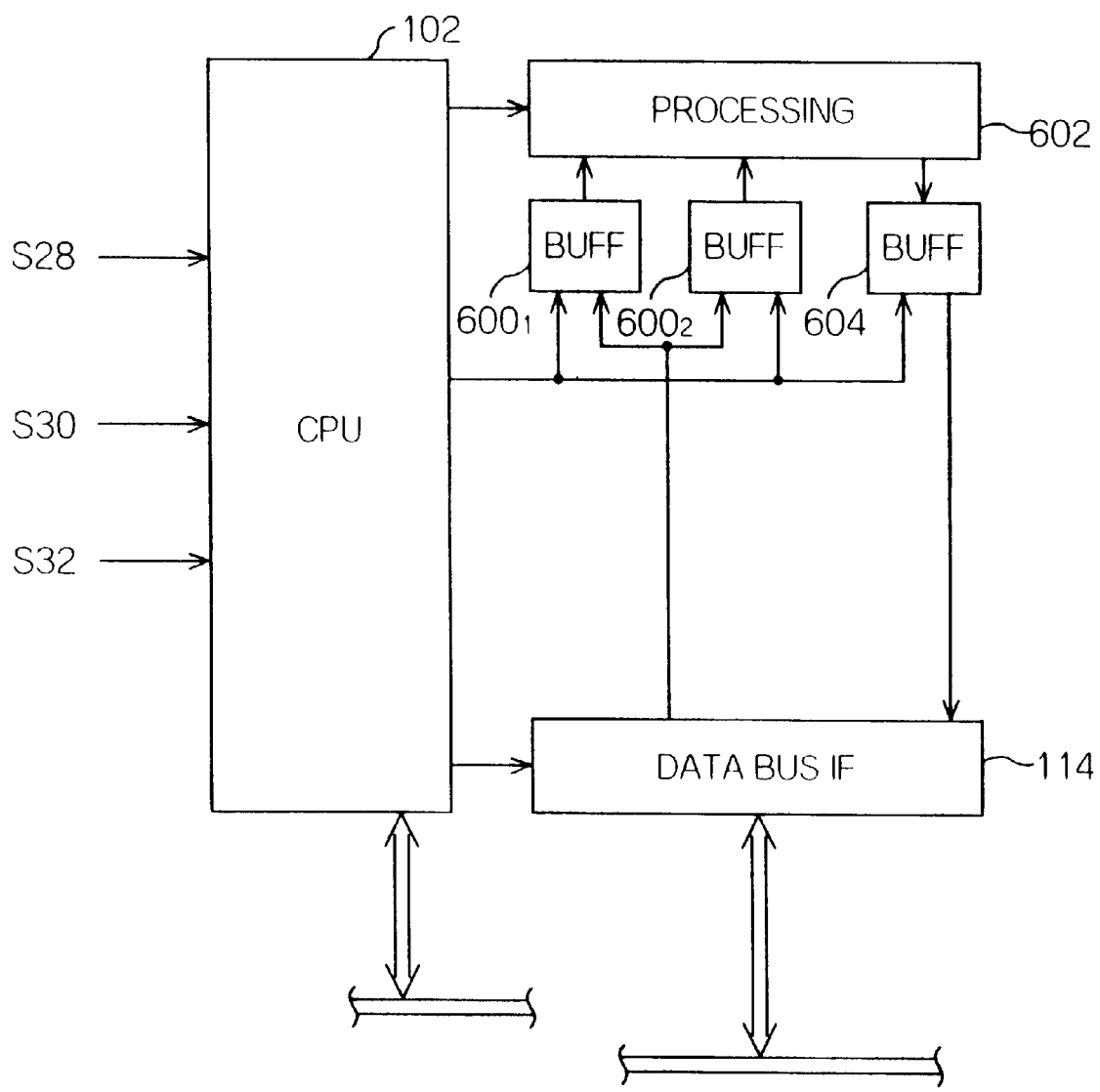
FIG. 10 is a view of the configuration of an AV data processing circuit for noncompressed audio and/or video data of the third embodiment.

FIG. 10 is a view of the configuration of the AV data processing circuit 62 for the noncompressed audio and/or video data in the third embodiment. Note that, among the component parts of the AV data processing circuit 60 shown in FIG. 9, the same references are given to the same component parts as the AV data input/output control circuits $10_1$ to $10_n$ shown in FIG. 4 and the data processing circuit 60 shown in FIG. 9.

Note that where the storage device 26 records and reproduces the noncompressed audio and/or video data or where the storage device 26 includes the compressing circuit 120 and the expanding circuit 122 etc. in place of the data processing circuit 60, as shown in FIG. 10, an AV data processing circuit 62 obtained by removing the memory circuit 112, the compressing circuit 120, and the expanding circuit 122 from the data processing circuit 60 can be used.

FIGS. 11A to 11F are views illustrating the contents of processing to be performed by the processing circuit 602 of the data processing circuits 60 and 62 shown in FIG. 9 and FIG. 10 with respect to the audio and/or video data.

Figures 11A, 11B, 11C, 11D, 11E, 11F, 11G, 11H:
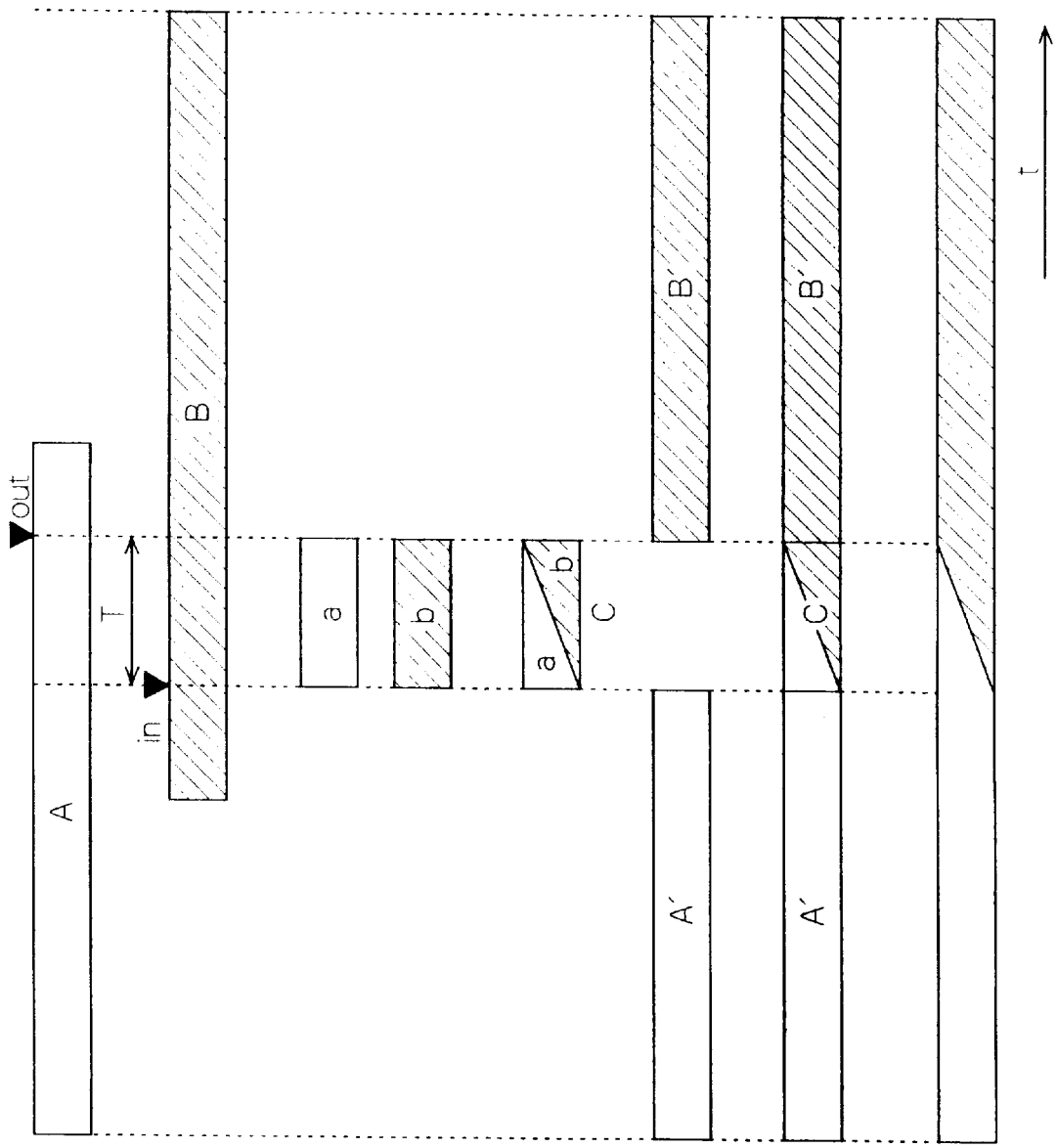
FIGS. 11A to 11H are views illustrating the contents of the processing performed by the processing circuits of the data processing circuits shown in FIG. 9 and FIG. 10 with respect to audio and/or video data.

As shown in FIG. 11A, the processing circuit 602 receives the audio and/or video data A via the buffer circuit $600_1$. And as shown in FIG. 9B, the audio and/or video data B via the buffer circuit $600_2$.

The processing circuit 602 mixes the audio and/or video data a (FIG. 11C) and b (FIG. 11D) between the boundary parts of these audio and/or video data (point IN to point OUT shown in FIG. 11A and FIG. 11B) so that a state where the ratio of the audio and/or video data a is larger gradually changes to a state where the ratio of the audio and/or video data b is larger and thereby generates the audio and/or video data C as shown in FIG. 11E. Further, the processing circuit 602 inserts the audio and/or video data C between the audio and/or video data A' before the point IN and the audio and/or video data B' after the point OUT (FIG. 11F) as shown in FIG. 11G to generate the audio and/or video data after the AB roll processing (FIG. 11H) and outputs this to the storage device 26. Note that, it is possible to supply only the audio and/or video data C to the storage device 26 so that this is stored in the storage device 26.

Below, the operation of the data recording and reproduction apparatus 3 will be explained.

Figure 12:
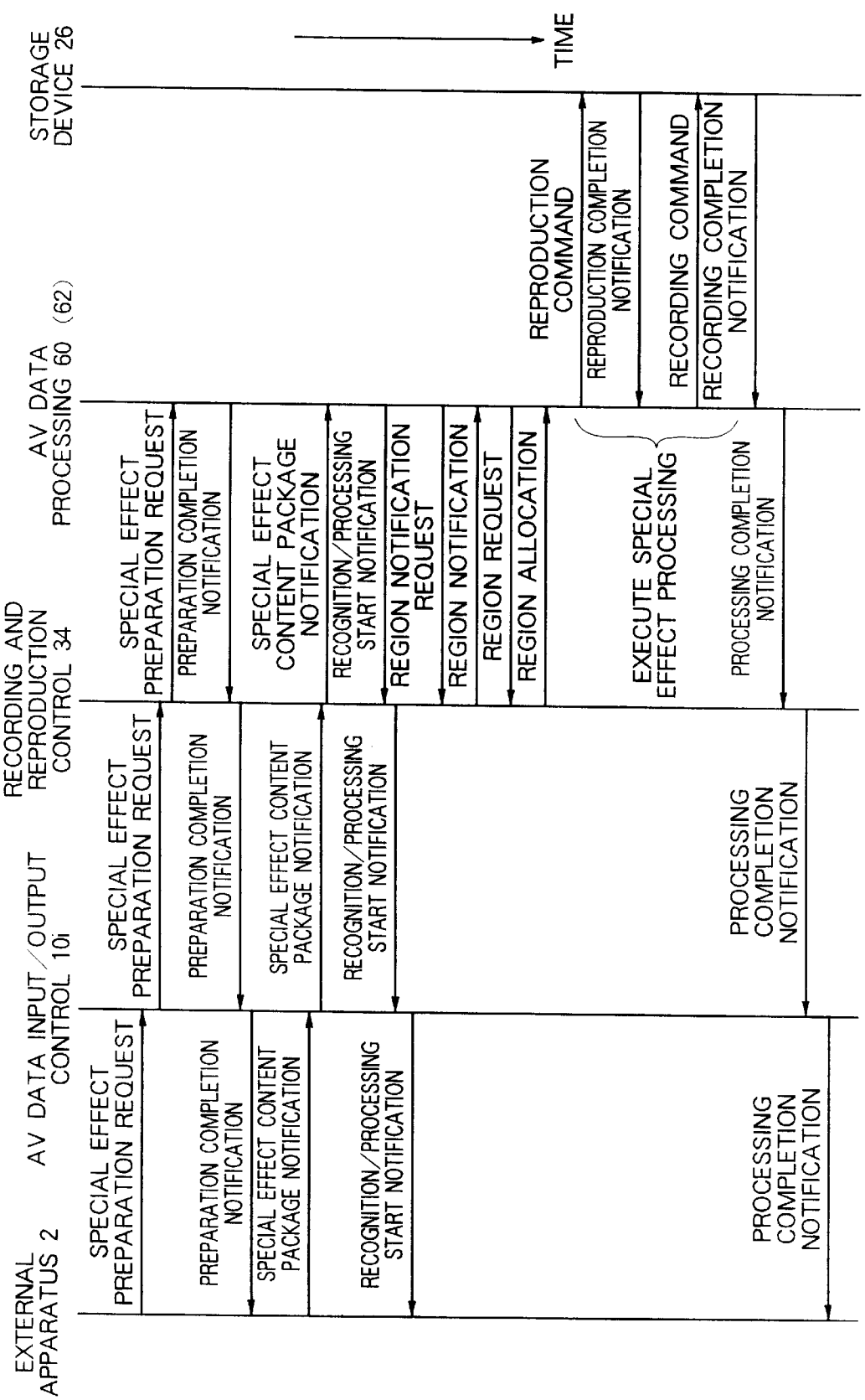
FIG. 12 is a view of the signal sequence among the component parts of the data according and reproduction apparatus when the data processing circuits shown in FIG. 9 and FIG. 10 performs the processing with respect to the audio and/or video data reproduced by the recording apparatus.

FIG. 12 is a view of a signal sequence among the component parts of the data recording and reproduction apparatus 3 when the data processing circuit 60 (62) shown in FIG. 9 and FIG. 10 performs the processing with respect to the audio and/or video data reproduced by the storage device 26. Note that, in FIG. 12, exceptional processing is omitted.

As shown in FIG. 12, a special effect preparation request signal is output as the control signal $S10a_i$ from the editing apparatus (external apparatus $2_i$) connected to the AV data input/output control circuit $10_i$ to the AV data input/output control circuit $10_i$. The AV data input/output control circuit $10_i$ outputs the special effect preparation request signal to the recording and reproduction control circuit 34, and the recording and reproduction control circuit 34 outputs the special effect preparation request signal to the data processing circuit 60 (62).

The data processing circuit 60 receiving the special effect preparation request signal performs the preparations for performing the special effect processing and, when the preparation is completed, outputs a preparation completion notification to the recording and reproduction control circuit 34. The recording and reproduction control circuit 34 and the AV data input/output control circuit $10_i$ return the preparation completion notification signal to the external apparatus $2_i$ as the control signal $S10a_i$.

The external apparatus $2_i$ receiving the preparation completion notification signal designates the audio and/or video data A (FIG. 11A) and B (FIG. 11B) to be covered by the fade-in and fade-out editing, etc. designates the contents of processing (fade-in and fade-out processing, etc.), and outputs a special effect content package notification signal for requesting the start of processing to an AV data input/output control circuit $10_i$. The AV data input/output control circuit $10_i$ and the recording and reproduction control circuit 34 output the special effect content package notification signal to the data processing circuit 60 (62).

The data processing circuit 60 (62) receiving the special effect content package notification signal outputs a recognition/processing start notification to the recording and reproduction control circuit 34. The recording and reproduction control circuit 34 and the AV data input/output control circuit $10_i$ output the recognition/processing start notification to the external apparatus $2_i$.

The data processing circuit 60 outputs a region notification request for requesting the notification of the recording region in which the audio and/or video data A and B are recorded to the recording and reproduction control circuit 34, and the recording and reproduction control circuit 34 outputs the region notification signal indicating the recording region in which the audio and/or video data A and B are recorded to the data processing circuit 60.

The data processing circuit 60 outputs a region request signal for requesting the allocation of recording regions of the recording medium of the storage device 26 for recording the processed audio and/or video data to the recording and reproduction control circuit 34.

The recording and reproduction control circuit 34 received the region request signal outputs the region allocation signal for allocating the recording regions of the recording medium of the storage device 26 for recording the processed audio and/or video data to the data processing circuit 60.

The data processing circuit 60 designates the recording region of the audio and/or video data A and B based on the region notification signal and outputs a reproduction command signal for requesting the reproduction of the audio and/or video data A and B to the storage device 26.

The storage device 26 reproduces the audio and/or video data A and B (not illustrated in FIG. 12) based on the reproduction command signal and sequentially outputs the same to the data processing circuit 60. The data processing circuit 60 performs the fade-in and fade-out processing, etc. shown in FIGS. 11A to 11H with respect to the audio and/or video data A and B input from the storage device 26.

The storage device 26 outputs a reproduction completion notification signal to the data processing circuit 60 at a point of time when the reproduction is completed.

The data processing circuit 60 outputs a recording command signal for designating the recording region in which the processed audio and/or video data are to be recorded to record them at the storage device 26 based on the region allocation signal.

The storage device 26 sequentially records the audio and/or video data input from the data processing circuit 60 based on the recording command signal.

When the recording of the audio and/or video data is ended, the storage device 26 outputs a recording completion notification signal to the data processing circuit 60. The data processing circuit 60, the recording and reproduction control circuit 34, and the AV data input/output control circuit 10$_i$, output the recording completion notification signal to the AV data input/output control circuit 10$_i$.

Note that, it is possible to store the audio and video data A', C, B' shown in FIG. 11G as the processed audio and/or video data with respect to the allocated area in the storage device 26 or store only the audio and/of video data as the processed audio and/or video data with respect to the allocated area in the storage device 26. The method of reproduction of the audio and/or video data when storing only the audio and/or video data C as the processed audio and/or video data with respect to the allocated area in the storage device 26 and afterward obtaining the processed audio and video A, ' C, B' from the storage device 26 will be explained. In this case, first it reproduces the audio and/or video data to the point shown in FIG. 11A based on the data received from the recording and reproduction control circuit 34 and indicating the area in which the audio and/or video data is stored, then reproduces the audio and/or video data C shown FIG. 11E performed by the special effect processing and stored in the designated area, and then it reproduces the audio and/or video data B from the point Q shown in FIG. 11A to be able to get the processed audio and/or data A', C, B'. In this case, it is not need to store the audio and/or video data A', B' to the storage 26, so that it is possible to use the capacity of the storage device 26 efficiently.

Figure 13:
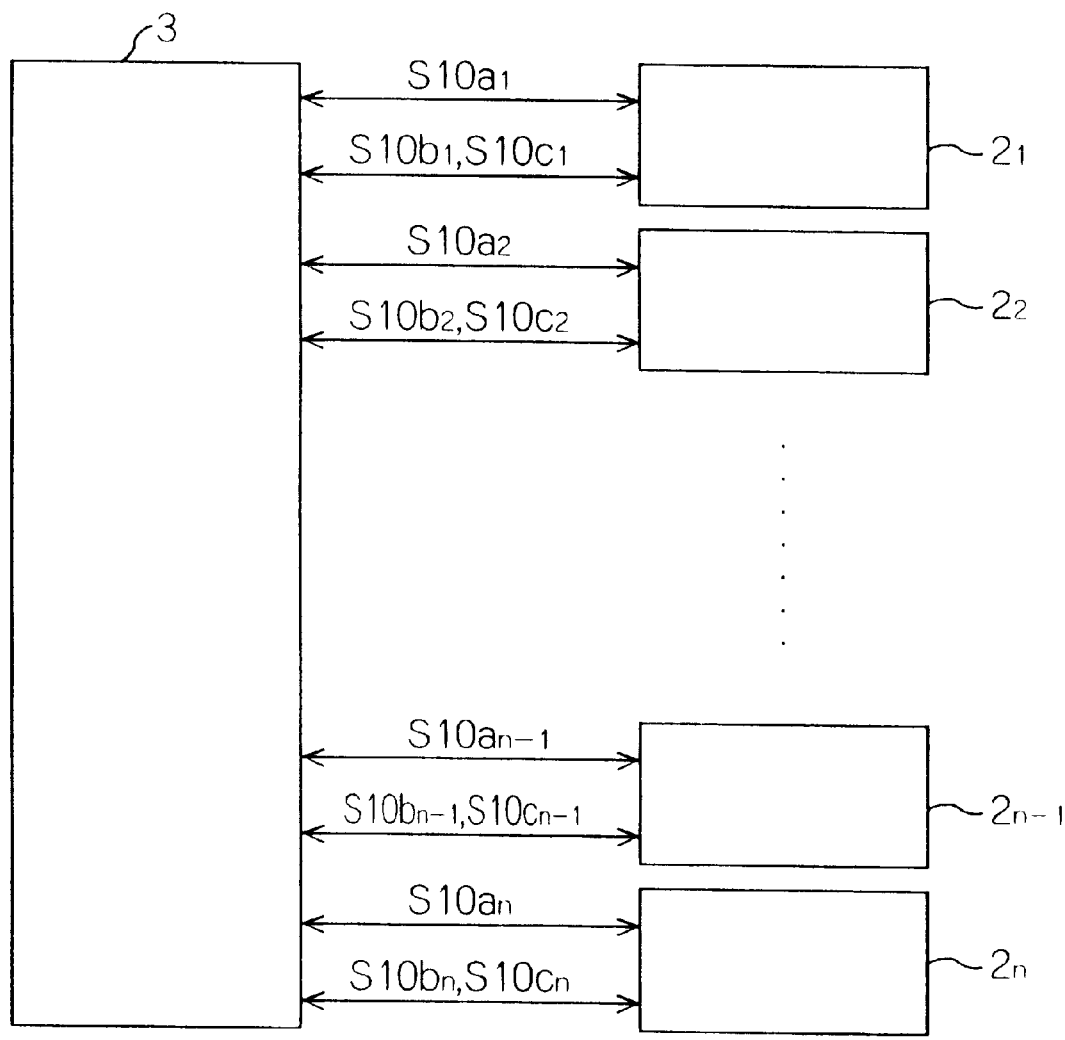
FIG. 13 is a view illustrating the connection configuration of the external apparatus shown in FIG. 3 and the data recording and reproduction apparatus shown in FIG. 8.

Note that, in the data recording and reproduction apparatus 3, as shown in FIG. 13, n number of external apparatuses 2$_1$ to 2$_n$ are connected and all of the external apparatuses 2$_1$ to 2$_n$ can utilize the special effect processing by the data processing circuit 60.

Further, a configuration wherein the data recording and reproduction apparatus 3 has a plurality of AV data processing circuits 60 is also possible.

Further, modification the same as those shown in the first embodiment and the second embodiment are also possible with respect to the data recording and reproduction apparatus 3 shown in the third embodiment.

According to the above explained audio and/or video data recording and reproduction apparatus of the present invention, in a broadcasting system of a television broadcasting station, the size and functions of the server system for the audio and/or video data can be changed in accordance with the size of operations of the individual television broadcasting station or the type of operations to which the broadcasting system is applied in the same television broadcasting station, the change of the functions and configuration is easy, the expandability is high, and the cost is low.

Further, in an editing system using the above explained audio and/or video data recording and reproduction apparatus according to the present invention, it is possible to supply the audio and/or video data serving as stock for a plurality of editing apparatuses in an editing system and record the edited data and in addition possible to share use of an expensive data processing means for editing among these editing apparatuses and consequently lower the cost of the editing apparatus.

What is claimed is:

1. A video data recording and reproduction apparatus having:

a common data bus;

a common control bus;

recording and reproducing control means directly coupled to said common control bus and not directly coupled to said common data bus for controlling recording and reproducing of video data with respect to a storage medium;

a plurality of external apparatuses;

a plurality of input/output control means each coupled to a respective external apparatus for receiving a number of control signals from the respective external apparatus and for inputting and outputting said video data between said storage medium and the respective external apparatus based on said number of control signals; and a single data processing device coupled by way of said common data bus and said common control bus to each of said plurality of input/output control means for performing predetermined special effect processing on received video data based on at least one control signal received from the respective external apparatus via the respective input/output control means and outputting said processed video data;

wherein each of said input/output control means and said single data processing device are directly coupled to the common data bus and common control bus.

2. A video data recording and reproduction apparatus as set forth in claim 1, wherein said recording and reproducing control means responds to the respective said number of control signals from said external apparatus via said input/output control means and supplies to said data processing means, data indicating the area on said storage medium in which video data to be reproduced is stored and the data indicating the area on said storage medium in which video data processed by the special effect processing by said data processing means is stored and said data processing means makes said recording and reproducing control means reproduce said video data based on the received data indicating said area and makes said recording and reproducing control means store said video data processed by the predetermined special effect processing to said storage medium.

3. A video data recording and reproduction apparatus as set forth in claim 2, wherein said data processing means makes said recording and reproducing control means store only the video data in a video period processed by the predetermined special effect processing.

4. A video data recording and reproduction apparatus as set forth in claim 3, wherein when said input/output control means receives a request for reproduction of video data processed by the predetermined special effect processing from the respective external apparatus, said recording and reproducing control means reproduces the video data in a video period processed by the predetermined special effect processing and the video data to be assigned forward and backward thereof based on the data indicating the area received from said recording and reproducing control means.

5. An audio and/or video data recording and reproduction apparatus having:
- a common data bus;
- a common control bus;
- recording and reproducing control means directly coupled to said common control bus and not directly coupled to said common data bus for controlling recording and reproducing of audio and/or video data with respect to a storage medium;
- a plurality of external apparatuses;
- a plurality of input/output control means each coupled to a respective external apparatus for receiving a number of control signals from the respective external apparatus and for inputting and outputting said audio and/or video data between said storage medium and the respective external apparatus based on said number of control signals; and
- data processing means coupled by way of said common data bus and said common control bus to each of said plurality of input/output control means for performing predetermined special effect processing on received audio and/or video data based on at least one control signal received from the respective external apparatus via the respective input/output control means and outputting said processed audio and/or video data;
- wherein each of said input/output control means and said single data processing means are directly coupled to the common data bus and the common control bus.

6. A video data recording and reproducing apparatus having:
- recording and reproducing control means for controlling recording and reproducing of video data with respect to a storage medium;
- a plurality of external apparatuses;
- a plurality of input/output control means each coupled to a respective external apparatus for receiving a number of control signals from the respective external apparatus and for inputting and outputting said video data between said storage medium and the respective external apparatus based on said number of control signals;
- a single data processing device coupled to each of said plurality of input/output control means for performing predetermined special effect processing on received video data based on at least one control signal received from the respective external apparatus via the respective input/output control means and outputting said processed video data;
- a common control bus coupled to the plurality of input/output control means, said recording and reproducing control means and said storage medium through which control signals are transmitted; and
- a common data bus, separate from said common control bus, coupled to said plurality of input/output control means through which the video data is transmitted therefrom,
- wherein the recording and reproducing control means is directly coupled to said common control bus and is not directly coupled to said common data bus, and
- wherein each of said input/output control means and said single data processing device are directly coupled to the common data bus and the common control bus such that said single data processing device is coupled by way of said common data bus and said common control bus to each of said plurality of input/output control means.

7. An audio/video data recording and reproducing apparatus having:
- recording and reproducing control means for controlling recording and reproducing of audio and/or video data with respect to a storage medium;
- a plurality of external apparatuses;
- a plurality of input/output control means each coupled to a respective external apparatus for receiving a number of control signals from the respective external apparatus and for inputting and outputting said audio and/or video data between said storage medium and the respective external apparatus based on said number of control signals;
- a single data processing device coupled to each of said plurality of input/output control means for performing predetermined special effect processing on received audio and/or video data based on at least one control signal received from the respective external apparatus via the respective input/output control means and outputting said processed audio and/or video data;
- a common control bus coupled to the plurality of input/output control means, said recording and reproducing control means and said storage medium through which control signals are transmitted; and
- a common data bus, separate from said common control bus, coupled to said plurality of input/output control means through which the audio/video data is transmitted,
- wherein the recording and reproducing control means is directly coupled to said common control bus and is not directly coupled to said common data bus, and
- wherein each of said input/output control means and said data processing device are directly coupled to the common data bus and the common control bus such that said single data processing device is coupled by way of said common data bus and said common control bus to each of said plurality of input/output control means.

* * * * *